Figure 1:
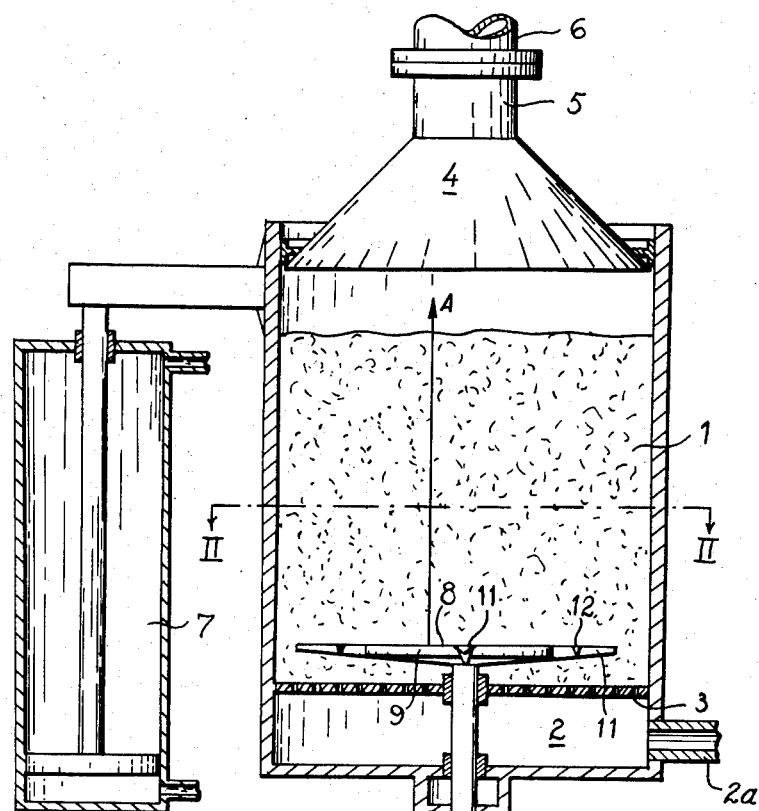

Jan. 4, 1966     D. H. BROOKS     3,227,135

APPARATUS FOR COATING WITH PARTICULATE MATERIALS

Original Filed Jan. 24, 1961

Inventor
DONALD HERBERT BROOKS

By    James E Ryan
               Attorney

United States Patent Office 3,227,135
Patented Jan. 4, 1966

3,227,135
APPARATUS FOR COATING WITH
PARTICULATE MATERIALS
Donald Herbert Brooks, Denver, Johannesburg, Transvaal, Republic of South Africa, assignor to International Protected Metals, Inc., South Plainfield, N.J., a corporation of Delaware
Continuation of application Ser. No. 84,626, Jan. 24, 1961. This application Nov. 17, 1964, Ser. No. 412,597
12 Claims. (Cl. 118—408)

The present application for Letters Patent is a continuation-in-part of my co-pending application for Letters Patent Serial No. 846,376 filed October 14, 1959, now abandoned and a continuation of my co-pending application No. 84,626, filed January 24, 1961, now abandoned.

The present invention relates to improvements in methods and means for coating with particulate materials, more particularly to an improvement of the method and means described and claimed in the said co-pending application, which by reference thereto forms part of the present disclosure.

In the said application a process is described and claimed which comprises contacting the surface to be coated with a bed of particulate coating material in an adequately mobile state of even aeration for substantially uniform contacting of the surfaces to be coated with the particulate material intermediate between that of the truly fluidized material and that of the loosely settled material during at least a substantial part of the coating period while maintaining conditions suitable to cause the adherence of the particles to the surface to be coated, either by rendering the said surface itself adhesive prior to the above-mentioned contacting step or by heating the surface to be coated to a temperature at which the particles e.g. thermoplastic resin particles become at least plastiform enough to adhere to the surface.

According to one embodiment of the said process a fluidized bed is first set up with a bulk density corresponding to optimum fluid conditions or a lower bulk density not below the limit under which a substantial proportion of the material becomes entrained in the gas stream, whereafter the fluidized bed is caused to collapse with the surface to be coated in contact therewith, more particularly according to one embodiment by decreasing the volume of the space occupied by the normally fluidized bed in such a manner that the aerated material is displaced into contact with the hot surface and that the gravitational head on the bottom of the fluidized bed is increased to such an extent that collapsing of the bed is initiated, the volume of the lower fluidizing space being subsequently increased again so as to allow the particulate material to fall back into the fluidizing space proper. This procedure is applicable to the lining of hollow bodies or the exterior coating of bodies contained inside the confined hollow space. As described in the meanwhile abandoned aforementioned application Serial No. 846,376, the above procedure results of necessity in a favorable intermediate condition of aeration in which the coating material in contact with the surface being coated is more rarefied than a loosely settled powder but less rarefied than a fluidized bed. An alternative method described in the same application for achieving the same results comprises fluidizing the coating material and then throttling the supply of aerating medium sufficiently, e.g. by means of a valve to produce the said intermediate condition of aeration.

The first mentioned embodiment may be carried out with an aerating vessel comprising means for altering the volume thereof and an opening in the top of the vessel to which the space containing the surface to be coated is connected. The second embodiment as described in application Serial No. 846,376 is carried out with the same apparatus, but having its top removed, articles being coated being introduced from above into the bed in the said intermediate condition and held suspended in contact with the bed. The process as described in said application Serial No. 846,376 was shown to be applicable to a large variety of coating material known in the sinter coating art.

In the above-described process uneven fluidization or an uneven distribution of the fluidized material may occur during the fluidization stage. It is an object of the present invention to eliminate or minimize these disadvantages.

With many coating powders there exists a tendency to compact and form lumps following the contacting stage of the process as a result of the diminished degree of aeration and the collapsing of the bed, and even if normal fluidizing conditions are subsequently employed, such lumps may take a considerable time to break up, resulting in diminished process speeds.

It is a particular object of the invention to overcome or minimize this disadvantage.

Figure 2:
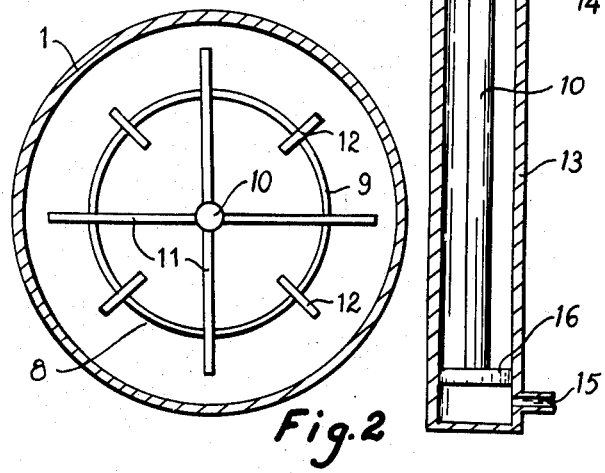

Further objects, advantages and applications of the invention and the manner in which it may be put into practice will be further described by way of example, partly with reference to the accompanying drawings in which FIG. 1 represents a vertical section through a pipe coating apparatus incorporating the features of the present invention; and FIG. 2 represents a cross-section along line II—II in FIG. 1.

The method in accordance with the invention, comprises agitating the particulate material with an agitating member moved up and down again during the aeration of the particulate material.

The agitating member may also be made to revolve or swivel while moving up and down.

The movement of the agitating member or the like may be effected manually, mechanically, electrically or by any other suitable means, preferably by fluid actuated means, i.e. pneumatic or hydraulic means.

The agitating member may be so operated that within a set period of time, every portion of the aerated bed is evenly stirred or agitated, ensuring an even distribution of the aerated material. This may preferably be attained by carrying out the operation with a gridlike or similar agitating member having a small solid cross-sectional area compared with the total cross-sectional area spanned by the agitating member, which total cross-sectional area corresponds to the internal cross-section of the aerating vessel, allowance being made for the easy, unrestricted up and down movement of the agitating member inside the aerating vessel.

Whether the up and down movement of the agitating member has to be carried out repeatedly during each homogenizing stage of the coating process depends on the ease with which the coating powder can be homogenized. Preferably, the said agitating member is rapidly moved upwards and slowly moved downwards. With most coating powders a single such up and down movement from time to time, e.g. between successive contacting periods of the coating process is adequate for producing the even agitation previously referred to. Obviously, in order to agitate the entire bed in a single up and down stroke, the amplitude of the movement must correspond essentially to the height of the bed.

The scope of the present invention is also to be understood to cover the abovementioned type of agitating member in conjunction with suitable means, e.g. a rod or the like, with which the said movement of the agitating member is brought about.

A preferred embodiment of the agitating member, in accordance with the invention, comprises a frame which may be circular, square or elliptical or of any other desired shape but which is preferably in the shape of a ring, said frame being connected by means of struts to a rod or the like which rod or the like is used for lifting, lowering and/or rotating or swivelling the agitating member, said rod passing through the top or bottom of the aerating vessel in such a way that an up and down movement of the agitating member may be easily and smoothly effected.

During a downward movement, the agitating member should have as little tendency as possible to compact the particulate coating material. For this reason the components of the agitating member preferably have a general downward taper.

The frame, in the preferred embodiment, the ring, may be provided with a plurality of transverse members extending outwardly and/or inwardly from the periphery of the said frame, without actually engaging the said rod.

The invention and the manner in which it may be put into practice will be further described by way of example with reference to the accompanying drawings:

In the drawings, FIG. 1 represents a vertical section through a pipe coating apparatus incorporating the features of the present invention;

FIG. 2 represents a cross-section along line II—II in FIG. 1.

Referring to the drawings, the pipe coating plant comprises an aerating vessel 1 comprising a gas box 2 having an inlet 2a and being separated from the remainder of the aerating vessel by a gas-previous bed support and gas distributing plate 3. An inverted funnel-shaped structure 4 is provided, movable in piston-like manner inside the aerating vessel. The stem or hollow shaft 5 of the said funnel is flanged and a pipe 6 to be internally coated is mounted on top thereof. This pipe has been previously heated in any suitable manner to a suitable temperature above the fusing temperature of the coating powder in the aerating vessel 1.

The aerating vessel itself is supported by two or more hydraulically or pneumatically operated lifting devices 7, whereas in this particular example the funnel-shaped structure 4, 5 is mounted stationary by means not shown, thus rendering the top of the aerating vessel and the aerating vessel itself relatively movable to one another in an up and down direction, motivated by device 7.

Inside the aerating vessel 1 an agitating member 8 is provided, comprising a circular frame 9 connected to a lifting rod 10 by struts 11. Interspaced between the said struts, a number of transverse members 12 are evenly distributed around the periphery of the ring-shaped frame 9, extending both outwardly and inwardly from the said frame without actually engaging either the lifting rod 10 or the walls of the aerating vessel. As can be seen from the drawing, all parts of the actual agitating member have a downward taper. The lifting rod 10 passes through the air distributing plate 3 and the bottom of the airbox into a pneumatic or hydraulic cylinder 13, provided with gas or fluid connections 14 and 15. The connecting rod 10 terminates in a piston 16. As can be seen from FIG. 1, the length of cylinder 13 is such as to afford a stroke length to piston 16 equal to the maximum height of the bed in vessel 1.

The apparatus is operated as follows:

The contents of the aerating vessel are aerated by passing gas through inlet 2a and air distributing plate 3 in a manner known as such to produce a fluidized bed.

Just prior to the actual coating operation, the agitating member 8 is rapidly moved upwards right through the bed as indicated by arrow A and then returned rather more slowly to the position shown in FIG. 1, resulting in an even distribution of the aerated material whereafter the lifting devices 7 rapidly raise the whole aerating vessel, thereby reducing the volume of the aerating vessel below funnel-shaped structure 4 causing the displacement of the particulate coating material upwards through funnel 4 and shaft 5 into the pipe 6 which is to be coated internally. The powder is maintained in pipe 6 normally for a period of the order of five seconds, during which time the pressure head of the powder mass is so high that the original fluidized bed condition immediately ceases and is replaced by an intermediate condition of high aeration in which the powder particles do no longer carry out a whirling motion, during which the coating builds up as described in application Serial No. 846,376 previously referred to. After the contacting period the aerating vessel 1 is again lowered rapidly with respect to the funnel-shaped structure 4, 5 as a result of which the excess powder returns to the aerating vessel to be fluidized once again. The just described cycle of operations may then be repeated.

What is claimed is:

1. A coating apparatus for coating bodies with aerated particulate coating materials comprising an aerating vessel having an open top a gas pervious bottom and a gas box having an inlet for aerating gas, said box being positioned underneath said bottom for passing a finely divided stream of gas through said bottom, a grid-like agitating member vertically movable in said vessel, said member having a small solid cross sectional area compared with the total cross sectional area spanned by it, which total cross sectional area corresponds to the internal cross section of the aerating vessel, means for effecting movement of said agitating member, means for supporting an article to be coated above a bed of the particulate material supported on said bottom and means attached to the exterior of the aerating vessel for moving said vessel up and down to effect contact between the article and said bed.

2. A coating apparatus as set forth in claim 1 characterized in that said agitating member comprises a frame connected by means of struts to a rod forming part of said means for effecting movement of the agitating member, said rod passing through said bottom.

3. In the coating apparatus of claim 2 characterized in that said frame is ring shaped.

4. In the coating apparatus of claim 3, said frame having a plurality of transverse members extending from the periphery of said frame and terminating short of said rod.

5. In the combination of claim 1, said aerating vessel comprising a fixed and a movable part capable of relative sliding movement and said last means causing such relative movement.

6. In a coating apparatus as claimed in claim 5, the fixed part of said aerating vessel providing a piston-like closure therefor having an upwardly directed tubular casing communicating with the interior of said vessel and into which said coating material is bodily displaced.

7. A coating apparatus for internally coating hollow bodies with aerated particulate coating materials comprising: an aerating vessel having an open top, a gas-pervious bottom adapted to support a bed of the particulate coating material and a gas box having an inlet for aerating gas underneath the bottom for passing a finely divided stream of gas from the gas box through the bottom into the bed of coating material; a top to said aerating vessel having an outlet to said aerating vessel provided with means to support a hollow body, which is to be internally coated, above the open top means attached to the exterior of the aerating vessel for moving said vessel up and down to effect contact between the hollow body and said bed without increase in bulk volume from said aerating vessel through said outlet and into the said hollow body to be coated; a single horizontal grid-like agitating member inside the vessel and above said gas pervious bottom, vertically movable inside the vessel from near the bottom to near the top thereof and having a small solid cross sectional area compared with the total cross sectional area spanned by the agitating member, which total cross sectional area essentially corresponds to the internal cross section of the aerating vessel, allowing sufficient clearance for the free up and down movement of the agitating member inside the aerating vessel throughout the height of the vessel; and a piston cylinder combination operable by means of a flowable pressure medium and mechanically connected to the agitating member to impart to the latter a stroke extending essentially from the bottom to the top of the vessel.

8. A coating apparatus as claimed in claim 7 in which the agitating member comprises a frame having outlines essentially concentric with the outlines of the operating vessel, radial struts connecting the frame to a vertical rod passing through the bottom of the aerating vessel in sliding relationship with said bottom, said rod serving as the piston rod of said piston cylinder combination.

9. A coating apparatus as claimed in claim 8 having a plurality of transverse radial members mounted between said struts on said frame and terminating short of the said vertical rod.

10. A coating apparatus as claimed in claim 7, said horizontal grid-like agitating member including members tapering downwardly.

11. A coating apparatus as claimed in claim 7 in which the top of the aerating vessel has the shape of an inverted funnel, the rim of which is provided with sealing means to establish a slidable sealing relationship with the inside of the aerating vessel and the stem of which comprises said means for connecting the hollow body to be coated internally.

12. A coating apparatus for coating bodies with aerated particulate coating material comprising an aerating vessel having an open top, a gas pervious bottom adapted to support a bed of the particulate coating material and a gas box having an inlet for aerating gas underneath the bottom for passing a finely divided stream of gas from the gas box through the bottom into the bed of coating material, a top for said aerating vessel carrying an outlet from said aerating vessel; a tubular casing connected to said outlet; means attached to the exterior of the aerating vessel for moving said vessel up and down; a single horizontal grid-like agitating member inside the vessel and above said gas pervious bottom, vertically movable inside the vessel from near the bottom to near the top thereof and having a small solid cross sectional area compared with the total sectional area spanned by the agitating member, which total cross sectional area essentially corresponds to the internal cross section of the aerating vessel, allowing sufficient clearance for the free up and down movement of the agitating member inside the aerating vessel throughout the height of the vessel; and a mechanism operable and mechanically connected to the agitating member to impart to the latter a stroke extending essentially from the bottom to the top of the vessel.

References Cited by the Examiner

UNITED STATES PATENTS

| 2,542,587 | 2/1951 | Smith | 208—158 |
| 2,635,949 | 4/1953 | Fenske et al. | 44—57 |
| 3,093,510 | 6/1963 | Olson et al. | 117—18 |

OTHER REFERENCES

Gemmer: "Das Wirbelsinterverfahren-Grundlagen, Verfahren und Gerate," Plastverabeiter, Sept. 1956, pp. 342–348.

Product Engineering, vol. 28, No. 1, Jan. 1957, pp. 140–143.

WILLIAM D. MARTIN, *Primary Examiner.*